United States Patent

Iwamura et al.

[11] Patent Number: 6,144,492
[45] Date of Patent: Nov. 7, 2000

[54] OPTICAL BLOCK AND DISPLAY UNIT

[75] Inventors: Atsushi Iwamura; Takaaki Iwaki; Hideki Katsuragawa, all of Tokyo; Toru Kawai, Kanagawa, all of Japan

[73] Assignee: Sony Corporation, Tokyo, Japan

[21] Appl. No.: 09/101,774

[22] PCT Filed: Nov. 28, 1997

[86] PCT No.: PCT/JP97/04364

§ 371 Date: Dec. 21, 1998

§ 102(e) Date: Dec. 21, 1998

[87] PCT Pub. No.: WO98/23993

PCT Pub. Date: Jun. 4, 1998

[30] Foreign Application Priority Data

Nov. 28, 1996 [JP] Japan .................................. 8-331419

[51] Int. Cl.$^7$ .................................................. G02B 5/30
[52] U.S. Cl. ........................... 359/487; 359/485; 349/95; 353/20; 362/19
[58] Field of Search ................................. 359/483, 485, 359/487, 495, 496, 497; 349/9, 95; 353/20; 362/19

[56] References Cited

U.S. PATENT DOCUMENTS

| | | | |
|---|---|---|---|
| 2,748,659 | 6/1956 | Geffcken et al. | 359/495 |
| 5,283,600 | 2/1994 | Imai | 359/495 |
| 5,357,370 | 10/1994 | Miyatake et al. | 359/487 |
| 5,751,480 | 5/1998 | Kitagishi | 359/495 |
| 5,757,547 | 5/1998 | Rodman et al. | 359/487 |
| 5,898,521 | 4/1999 | Okada | 359/487 |

FOREIGN PATENT DOCUMENTS

| | | |
|---|---|---|
| 5-107505 | 4/1993 | Japan . |
| 5-157915 | 6/1993 | Japan . |
| 8-304739 | 11/1996 | Japan . |

Primary Examiner—Darren Schuberg
Attorney, Agent, or Firm—Jay H. Maioli

[57] ABSTRACT

An optical block, which may be of a small size, for applying light efficiently to a display device such as a liquid crystal panel, and a display apparatus. The optical block (1) has a polarizing beam splitter (3) mounted on baseboard (2) at a predetermined angle with respect to light applied from a light source (10), for passing a P wave toward an exit side and reflecting an S wave, reflecting device (4) mounted on the baseboard (2) for reflecting the reflected S wave toward the exit side, and plane-of-polarization rotating device (5) mounted on the baseboard (2) for rotating the plane of polarization of the S wave reflected toward the exit side. The display apparatus has a light source (10), a first multilens array (12), the optical block (1), a second multilens array (13), separating device (14, 19) for separating emitted light into red light (R), green light (G), and blue light (B), light modulating device (17, 21, 26) for generating modulated red light, modulated green light, and modulated blue light based on the separated light, and emitting device (18) for combining the modulated red light, modulated green light, and modulated blue light and emitting combined modulated light. The optical block is of a thin structure so that it may be a space saver and lightweight. Optical paths from the light source to liquid crystal panels or the like may be reduced to reduce the size of the display apparatus.

4 Claims, 14 Drawing Sheets

OPTICAL BLOCK AND DISPLAY UNIT

TECHNICAL FIELD

The present invention relates to an optical block, which may be of a small size, for applying light efficiently to a display device such as a liquid crystal panel, and a display apparatus.

BACKGROUND ART

Recently, display apparatus such as projectors, television receivers, and computer display units which employ optical devices such as liquid crystal panels or the like are in widespread use. In a display apparatuses which employs a liquid crystal panel or the like, light emitted from a light source such as a metal halide lamp, a halogen lamp, or the like is applied to a liquid crystal panel having color filters (R, G, B), and the liquid crystal panel displays a colored video image as its output light. The output light from the liquid crystal panel is projected onto a screen by a projection lens.

Light radiated from an ordinary light source has two planes of polarization that are generally referred to as a P-polarized component (hereinafter referred to as a P wave) and an S-polarized component (hereinafter referred to as an S wave). The display apparatus has polarizing means positioned such that light emitted from the light source is applied to the polarizing means before being applied to the liquid crystal panel. The polarizing means applies light having a plane of polarization which is either the P wave or the S wave depending on a polarizer disposed in front of the liquid crystal panel.

If rays of randomly polarized light are applied to polarizing beam splitters (hereinafter referred to as a PBS) disposed in prisms, for example, at a given angle, then a P wave passes through the PBSs and an S wave is reflected by the PBSs. Both the P and S waves are refracted by end faces of the prisms into parallel rays of light, and only the S wave is converted into a P wave by being transmitted through a $\lambda/2$ plate. Alternatively, the S wave is converted into a P wave by being refracted by end faces of the prisms so as to be parallel to the direction of travel of the P wave that has passed through the PBSs, or reflected toward a $\lambda/2$ plate by a reflecting means such as a mirror or the like. According to the former process, one unit of optical block is employed. According to the latter process, one or two units of optical block are symmetrically arranged.

FIG. 12 shows the structure of a conventional polarizing means and optical paths. A light source 40 comprises a halogen lamp, a metal halide lamp, or the like. Light emitted from the light source is passed through an optical block 50, which applies only a P wave to a liquid crystal panel (not shown). The optical block 50 comprises a plurality of prisms 50a–50f of glass which are bonded together. PBSs 52 are disposed between the prisms 50b, 50e and between the prisms 50c, 50d, and wave plates 53 are disposed on front faces of the prisms 50a, 50f. P+S waves emitted from the light source 40 are represented by solid arrows. The path of a P wave separated by the optical block 50 is represented by white blank arrows, and the path of an S wave separated by the optical block 50 is represented by hatched arrows.

P+S waves emitted from the light source 40 are separated by the PBSs 52. The P wave passes through the PBSs 52 and is applied to the liquid crystal panel. The S wave is reflected by the PBSs 52, then reflected forward by the prisms 50a, 50f, and converted by the wave plates 53 into a P wave, which is applied to the liquid crystal panel. Therefore, only the P wave is emitted from front faces of the prisms 50d, 50e and the wave plates 53. In this manner, either one of the P+S waves emitted from the light source 40 is applied by the optical block 50 to the non-illustrated liquid crystal panel.

If the optical block 50 were not employed, then the aperture of the light source 40 would be similar in shape to the effective area of the liquid crystal panel. However, a liquid crystal panel for displaying horizontally long images having an aspect ratio of 16:9, for example, has its side areas that cannot uniformly be irradiated with light, and hence cannot have uniform illuminance. Furthermore, since it is difficult for rays of light emitted from a lamp light source of a large divergent angle to be applied efficiently to a liquid crystal panel, it is known to use a multilens array composed of a number of small lenses, for example, as an optical means, to increase rays of light which reach a liquid crystal panel and uniformize a distribution of illuminance.

If such a multilens array is used, then, as shown in FIG. 13, the multilens array is of a shape similar to a liquid crystal panel as a light modulating means and having an aspect ratio equal to the aspect ratio of an effective aperture of the liquid crystal panel. The multilens array comprises a plane multilens array 54 composed of a matrix of convex lenses 54a and positioned closer to a light source (not shown) and a plano-convex multilens array 55 composed of a plurality of convex lenses 55a facing the convex lenses 54a of the plane multilens array 54. The multilens array applies rays of light from the light source efficiently and uniformly to the effective aperture of the liquid crystal panel.

Rays of light emitted from the light source of a liquid crystal projector and applied to the multilens array 54 are converged onto the convex lenses 55a of the multilens array 55 by the convex lenses 54a. The rays of light applied to the convex lenses 55a are applied to a condenser lens 56 by a convex lens 55b on the exit side of the multilens array 55. After the rays of light are modulated by a liquid crystal panel 57 associated with front and rear polarizers, they are applied to a cross dichroic prism 58. Before the rays of light are applied to the condenser lens 56 by the convex lens 55b, they are separated into R, G, B light by optical elements such as dichroic mirrors. The dichroic prism 58 comprises four prisms bonded together by reflecting surfaces 58a, 58b in the form of thin films having predetermined reflecting characteristics.

In FIG. 13, only a path of green light G is indicated by the solid lines. However, red light R and blue light B are similarly optically modulated by respective liquid crystal panels (not shown), and thereafter, as indicated by the arrows, applied from respective different directions to the cross dichroic prism 58.

The red light R modulated by the liquid crystal panel 57 is reflected by the reflecting surface 58a of the dichroic prism 58 toward a projection lens (not shown). The blue light B is reflected by the reflecting surface 58b of the dichroic prism 58 toward the projection lens. The green light G passes through the reflecting surfaces 58a, 58b. The red light R, the green light G, and the blue light B are combined with each other into light along one optical axis, generating a color video signal which is applied to the projection lens (not shown). As described above, the red light and the blue light are applied from the respective directions indicated by the arrows to the cross dichroic prism 58, and reflected by the respective reflecting surfaces 58a, 58b to the projection lens.

With the multilens arrays 54, 55 of matrices of convex lenses 54a, 55a, the rays of light emitted from the light source can be applied to the effective aperture of the liquid crystal panel 57 more efficiently and uniformly than if only the condenser lens 56 were employed.

In FIG. 14, the optical block 50 is positioned at the aperture of the light source 40, and the multilens arrays 54, 55 are positioned at the aperture of the optical block 50. This arrangement is effective to utilize rays of light emitted from the light source 40 more efficiently than the arrangements shown in FIGS. 12 and 13.

The conventional optical block 50 has an exit surface wider than an entrance surface thereof, and hence tends to increase the angle of incidence of rays of light on the liquid crystal panel, resulting in a reduction in the contrast. If the light source 40 is designed for a smaller size in order to prevent such a reduction in the contrast, then the optical block 50 has to utilize rays of light having a large divergent angle. Moreover, since the entrance side of the conventional optical block is of a size proportional to the aperture of the light source 40, the exit side of the optical block is of a size greater than the light source 40. Consequently, the optical block needs a considerably large installation space and is costly.

If only the multilens arrays 54, 55 are provided, then because the randomly polarized light emitted from the light source is applied directly to the polarizers, about 60% of the entire quantity of the light is blocked, and hence the efficiency with which the light source is utilized is poor. If the optical block 50 and the multilens arrays 54, 55 are combined with each other, then the multilens arrays 54, 55 are of an increased size commensurate with the exit aperture of the optical block 50, resulting in an increase in the length of the optical path from the multilens array 55 to the liquid crystal panel 57, so that the overall apparatus has a large size.

In order to solve the above problems, the applicant has proposed a light source for a display apparatus which comprises multilens arrays and an optical block having a plurality of joined prisms (see Japanese patent application No. 7-290570). FIG. 15 shows the proposed light source as incorporated in the optical system of a liquid crystal projector. As shown in FIG. 15, a light source 110 comprises a metal halide lamp 110a disposed at the focal point of a parabolic mirror for emitting light substantially parallel to the optical axis of the parabolic mirror from its aperture. An IR-UV blocking filter 111 blocks unwanted rays in infrared and ultraviolet ranges of the light emitted from the light source 110, and passes only effective rays of light to a next optical means.

The optical means has a first multilens array 112 comprising a matrix of convex lenses 112a and a second multilens array 113 comprising a matrix of convex lenses 113a, two of which face each of the convex lenses 112a of the first multilens array 112. An optical block 101, which will be described later on, is disposed between the first multilens array 132 and the second multilens array 113.

The optical block 101 comprises a plurality of bonded prisms. Rays of light converged by the first multilens array 112 are applied to a certain one of the prisms of the optical block 101. The optical block 101 converts randomly polarized light (P+S waves) into a P wave (or an S wave), which is applied to some of the convex lenses 113a of the second multilens array 113. The P or S wave is then separated by various optical elements into R light, G light, and B light, which are applied to liquid crystal panels. Therefore, the first multilens array 112, the optical block 101, and the second multilens array 113 allow rays of light emitted from the light source 110 and passing through the IR-UV blocking filter 111 to be applied efficiently and uniformly to the effective apertures of the liquid crystal panels.

Dichroic mirrors 114, 119 for separating rays of light from the light source 110 into red light, green light, and blue light are disposed between the optical block 101 and the effective apertures of the liquid crystal panels. In FIG. 15, the red light R reflected by the dichroic mirror 114 has its direction of travel bent 90° by a mirror 115, and is applied through a condenser lens 116 to a red liquid crystal panel 117.

The green light G and the blue light B which have passed through the dichroic mirror 114 are separated from each other by the dichroic mirror 119. The green light G is reflected by the dichroic mirror 119 so that its direction of travel is bent 90°, and is applied through a condenser lens 120 to a green liquid crystal panel 121. The blue light B passes straight through the dichroic mirror 119, and travels through a relay lens 122, a mirror 124a, a relay lens 123, a mirror 124b, and a condenser lens 125 to a blue liquid crystal panel 126.

The red light, the green light, and the blue light which are optically modulated by the liquid crystal panels 117, 121, 126 are combined by a cross dichroic prism 118 as a light combining means. The red light R is reflected by a reflecting surface 118a toward a projection lens 130, and the blue light B is reflected by a reflecting surface 118b toward the projection lens 130. The green light G passes through the reflecting surfaces 118a, 118b. The R, G, B rays of light are thus combined to travel along one optical axis, and projected at an enlarged scale onto a screen (not shown) by the projection lens 130.

FIG. 16 is a perspective view of the optical block 101 as viewed from its front, and FIG. 17 is a fragmentary plan view of the optical block 101. As shown in FIGS. 16 and 17, the optical block 101 comprises triangular prisms 100a, 100e and parallelogrammatic prisms 200a, 200b, 200c, 200d, 100b, 100c, 100d which are bonded together. The randomly polarized light (P+S waves) emitted from the light source 110 and passing through the first multilens array 112 is applied to the optical block 101, as indicated by the solid arrows, and only a P wave is emitted from each of the prisms as indicated by the white blank arrows.

PBSs 103 (103a, 103b, 103c, 103c) for reflecting an S wave and passing a P wave therethrough, for example, are disposed on respective slanted exit ends of the prisms 200 (200a, 200b, 200c, 200d). The P wave that has passed through the PBSs 103 are emitted forward from front surfaces of the prisms 100 (100a, 10b, 100c, 100d). Mirrors 104 (104a, 104b, 104c, 104d) for reflecting forward the S wave reflected by the PBSs 103 are disposed on slanted surfaces of the prisms 200 which face the PBSs 103. ½ λ plates 105 (105a, 105b, 105c, 105d) are disposed on front surfaces of the prisms 200 for rotating the plane of polarization of the S wave reflected by the PBSs 103 thereby to convert the S wave into a P wave, which is emitted forward.

Accordingly, the prisms 200 serve as an entrance region of the optical block 101, and rays of light applied to the prisms 200 are separated or polarized by the PBSs 103 and the ½ λ plates 105, and a P wave is emitted forward from the prisms 100, 200. There are as many prisms 200 as the number of the convex lenses 112a of the first multilens array 112.

The optical block 101, which is composed of the prisms, the PBSs, the mirrors, etc., is capable of converting applied rays of randomly polarized light (P+S waves) into a P wave and emitting the P wave, and has entrance and exit sides whose areas are equal to each other. Since the optical block 101 is of a thinner structure than the conventional optical block, the optical block 101 is a space saver.

The optical block 101 is disposed between the first multilens array 112 and the second multilens array 113, as shown in FIG. 18, thereby providing the optical system as shown in FIG. 15.

DISCLOSURE OF THE INVENTION

The present invention provides an optical block, which may be of a small size, for applying light efficiently to a display device such as a liquid crystal panel, and a display apparatus.

According to the present invention, an optical block comprises a baseboard, a polarizing beam splitter mounted on the baseboard at a predetermined angle with respect to light applied from a light source, for passing a first polarized component of the light applied from the light source in a first direction and reflecting a second polarized component of the light applied from the light source in a second direction, reflecting means mounted on the baseboard, for reflecting the reflected second polarized component in the first direction, and plane-of-polarization rotating means for rotating the plane of polarization of the reflected second polarized component.

A display apparatus according to the present invention uses the optical block. The display apparatus comprises a light source for emitting light, a first multilens array for being irradiated with the light emitted from the light source, the optical block, a second multilens array for being irradiated with light emitted from the optical block, separating means for separating light emitted from the second multilens array into red light, green light, and blue light, light modulating means for generating modulated red light, modulated green light, and modulated blue light corresponding to a video signal which represents a video image to be projected, based on the red light, the green light, and the blue light, and emitting means for combining the modulated red light, the modulated green light, and the modulated blue light outputted from the light modulating means, and emitting combined modulated light.

Another display apparatus according to the present invention also uses the optical block. The display apparatus comprises a light source for emitting light, a first multilens array for being irradiated with the light emitted from the light source, a second multilens array for being irradiated with light emitted from the first multilens array, the optical block, separating means for separating light emitted from the second optical block into red light, green light, and blue light, light modulating means for generating modulated red light, modulated green light, and modulated blue light corresponding to a video signal which represents a video image to be projected, based on the red light, the green light, and the blue light, and emitting means for combining the modulated red light, the modulated green light, and the modulated blue light outputted from the light modulating means, and emitting combined modulated light.

With the above arrangements of the optical block and the display apparatus, since the entrance and exit sides of the optical block can be of the same size as the aperture of the light source, the optical block can have a thin structure. Therefore, the optical block may be a space saver and lightweight. In the display apparatus, optical paths from the light source to liquid crystal panels or the like may be shortened.

According to the present invention, an optical block comprises a first optical block having a first polarizing beam splitter having a first angle with respect to light applied from a light source, for passing a first polarized component of the light applied from the light source in a first direction and reflecting a second polarized component of the light applied from the light source in a second direction, first reflecting means having the first angle, for reflecting the reflected second polarized component in the first direction, and first plane-of-polarization rotating means having a second angle substantially perpendicularly to the first direction, for rotating the plane of polarization of the second polarized component reflected in the first direction, and a second optical block having a second polarizing beam splitter having a third angle at which the second polarizing beam splitter and the first polarizing beam splitter are symmetrical with respect to an optical axis of the light applied from the light source, for passing a first polarized component of the light applied from the light source in a first direction and reflecting a second polarized component of the light applied from the light source in a second direction, second reflecting means disposed at the third angle, for reflecting the reflected second polarized component in the first direction, and second plane-of-polarization rotating means disposed at the second angle, for rotating the plane of polarization of the second polarized component reflected in the first direction. A display apparatus comprises the above optical block and first and second multilens arrays.

With the above arrangements of the optical block and the display apparatus, since the optical block comprises the first and second optical blocks which are symmetrical with respect to the optical axis of the light emitted from the light source, differences between separating characteristics of the polarizing beam splitters depending on the angle of incidence of light on the optical block can cancel each other on opposite sides of the optical axis.

According to the present invention, furthermore, an optical block comprises a polarizing beam splitter having a predetermined angle with respect to light applied from a light source, for passing a first polarized component of the light applied from the light source in a first direction and reflecting a second polarized component of the light applied from the light source in a second direction, and reflecting and polarizing means having a reflecting layer for reflecting the reflected second polarized component in the first direction, and a plane-of-polarization rotating layer disposed on an upper surface of the reflecting layer, for rotating the plane of polarization of the second polarized component. A display apparatus comprises the above optical block and first and second multilens arrays.

With the above arrangement of the present invention, since the plane-of-polarization rotating layer is disposed on the upper surface of the reflecting layer, the number of components of the optical block may be reduced, or the process of manufacturing the optical block may be simplified.

BEST MODE FOR CARRYING OUT THE INVENTION

For a detailed description of the present invention, optical blocks and display apparatus according to embodiments of the present invention will be described below with reference to the accompanying drawings.

First, an optical system of a liquid crystal projector which employs a display apparatus according to an embodiment of the present invention will be described below with reference to FIG. 7.

Figure 7:
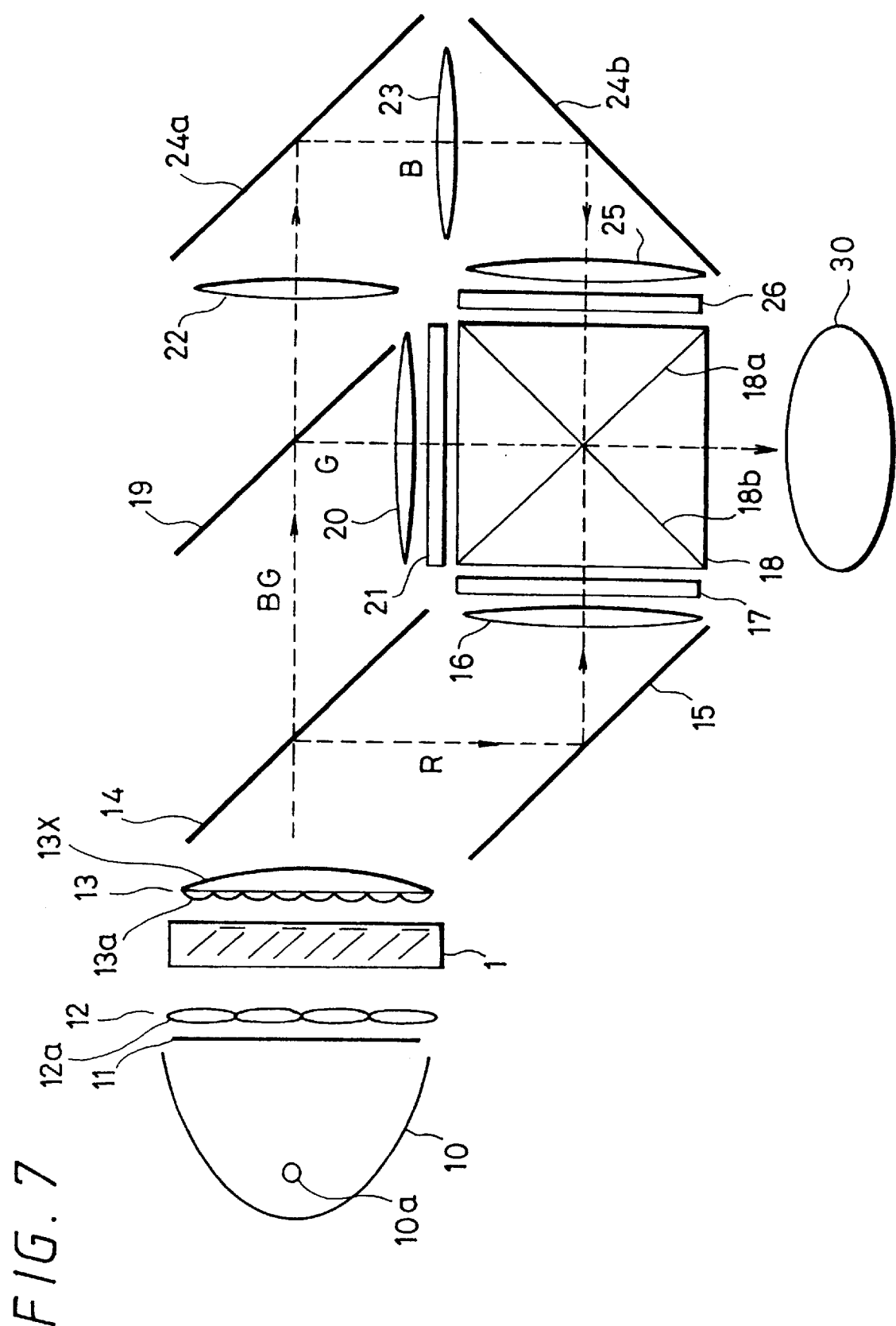
FIG. 7 is a view of an optical system of a liquid crystal projector according to an embodiment of the present invention.

As shown in FIG. 7, a light source 10 comprises a metal halide lamp 10a disposed at the focal point of a parabolic mirror for emitting light substantially parallel to the optical axis of the parabolic mirror from its aperture. An IR-UV blocking filter 11 blocks unwanted rays in infrared and ultraviolet ranges of the light emitted from the light source 10, and passes only effective rays of light to an optical means in front of the light source 10.

The optical means has a first multilens array 12 comprising a matrix of convex lenses 12a and having an outer profile similar to liquid crystal panels 17, 21, 26 as spatial light modulating elements and having an aspect ratio substantially equal to the aspect ratio of an effective apertures of the liquid crystal panels, an optical block 1 comprising optical components, and a second multilens array 13 comprising a matrix of convex lenses 13a disposed behind the optical block 1.

The optical block 1 comprises PBSs, mirrors, and ½ λ plates mounted on a baseboard, and serves to transmit incident light in space. As described in detail later on with reference to FIGS. 1 and 2, light of P+S waves converged by the first multilens array 12 enters certain PBSs, and is polarized into a P wave, for example, in this embodiment. The P wave then travels through the second multilens array 13 and various optical elements such as dichroic mirrors, is separated into R light, G light, and B light, which are applied to the liquid crystal panels.

Therefore, the first multilens array 12, the second multilens array 13, and the optical block 1 allow rays of light emitted from the light source 10 and passing through the IR-UV blocking filter 11 to be polarized into a P wave, which is applied efficiently and uniformly to the effective apertures of the liquid crystal panels 17, 21, 26.

The second multilens array 13 disposed behind the optical block 1 has the convex lenses 13a positioned on its face confronting the optical block 1, i.e., an entrance side thereof. The second multilens array 13 also has a single convex surface as a condenser lens 13X disposed on an exit side thereof which faces the liquid crystal panels.

Dichroic mirrors 14, 19 for separating rays of light from the light source 10 into red light, green light, and blue light are disposed between the second multilens array 13 and the effective apertures of the liquid crystal panels.

In the embodiment shown in FIG. 7, the dichroic mirror 14 reflects the red light R and passes the green light G and the blue light B. The red light R reflected by the dichroic mirror 14 has its direction of travel bent 90° by a mirror 15, and is converged by a condenser lens 16 and applied to a red liquid crystal panel 17.

The green light G and the blue light B which have passed through the dichroic mirror 14 are separated from each other by the dichroic mirror 19. The green light G is reflected by the dichroic mirror 19 so that its direction of travel is bent 90°, and is applied through a condenser lens 20 to a green liquid crystal panel 21. The blue light B passes straight through the dichroic mirror 19, and travels through a relay lens 22, a mirror 24a, a relay lens 23, a mirror 24b, and a condenser lens 25 to a blue liquid crystal panel 26.

Polarizers (not shown) for aligning the directions of polarization of light applied thereto are positioned in front of the liquid crystal panels 17, 21, 26, and polarizers (not shown) for passing only emitted light having a certain plane of polarization are positioned behind the liquid crystal panels 17, 21, 26. The liquid crystal panels 17, 21, 26 modulate the intensity of light with voltages applied to circuits (not shown) for energizing the liquid crystal materials.

Figure 13:
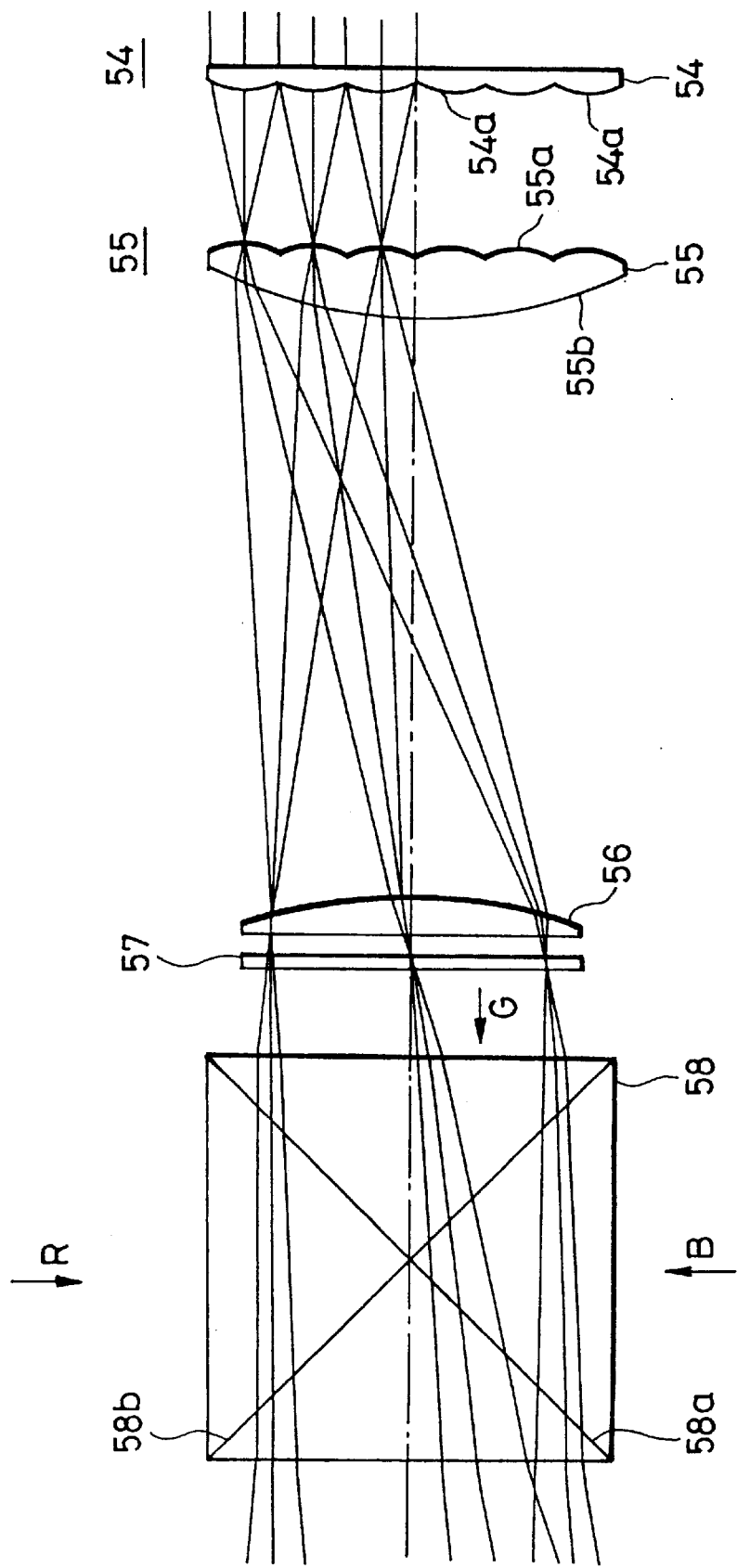
FIG. 13 is a view schematically showing optical paths in an arrangement which employs multilens arrays as conventional optical means.
Figure 14:
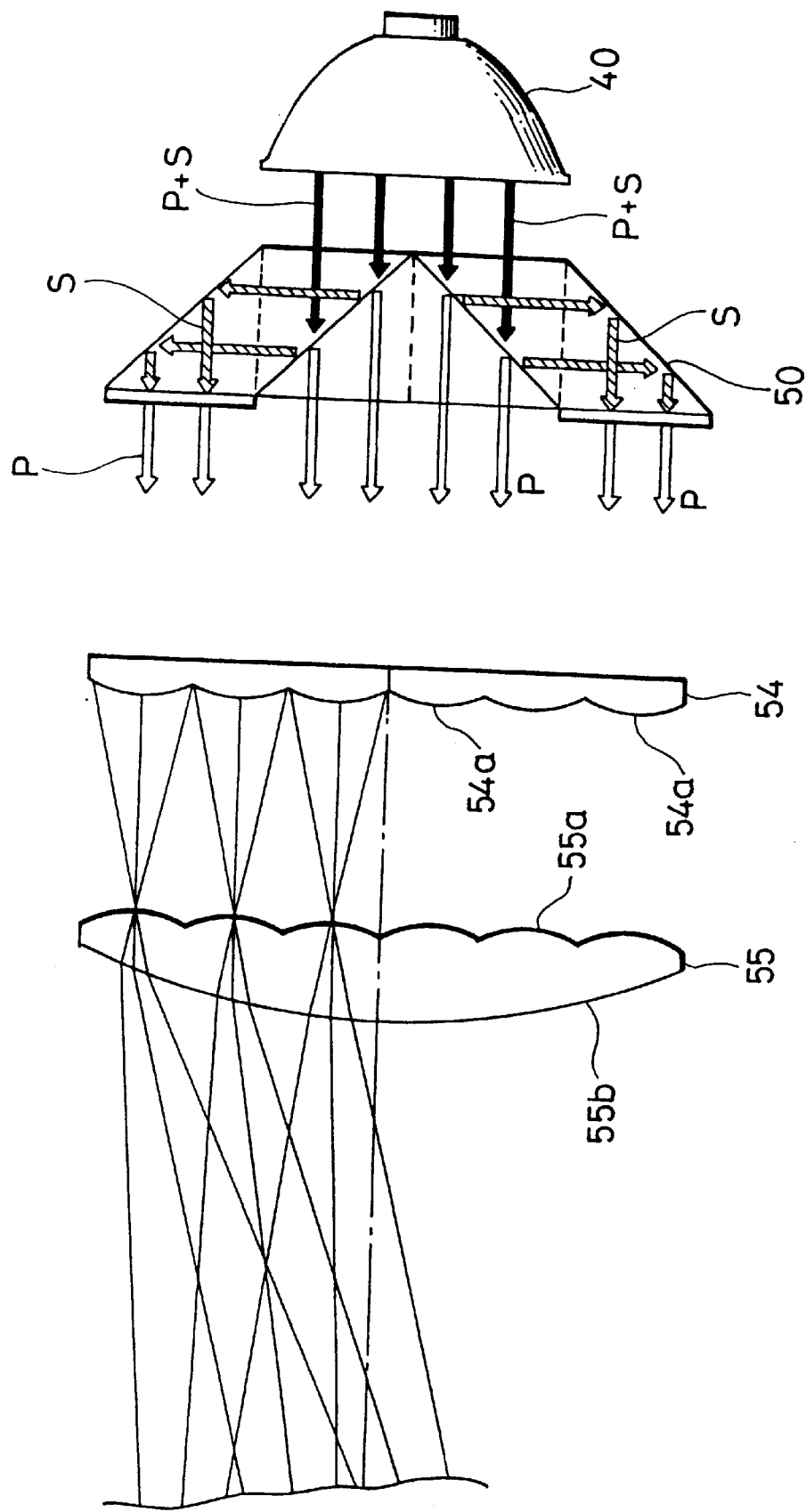
FIG. 14 is a view of a combination of the optical block and the multilens arrays as conventional optical means.
Figure 15:
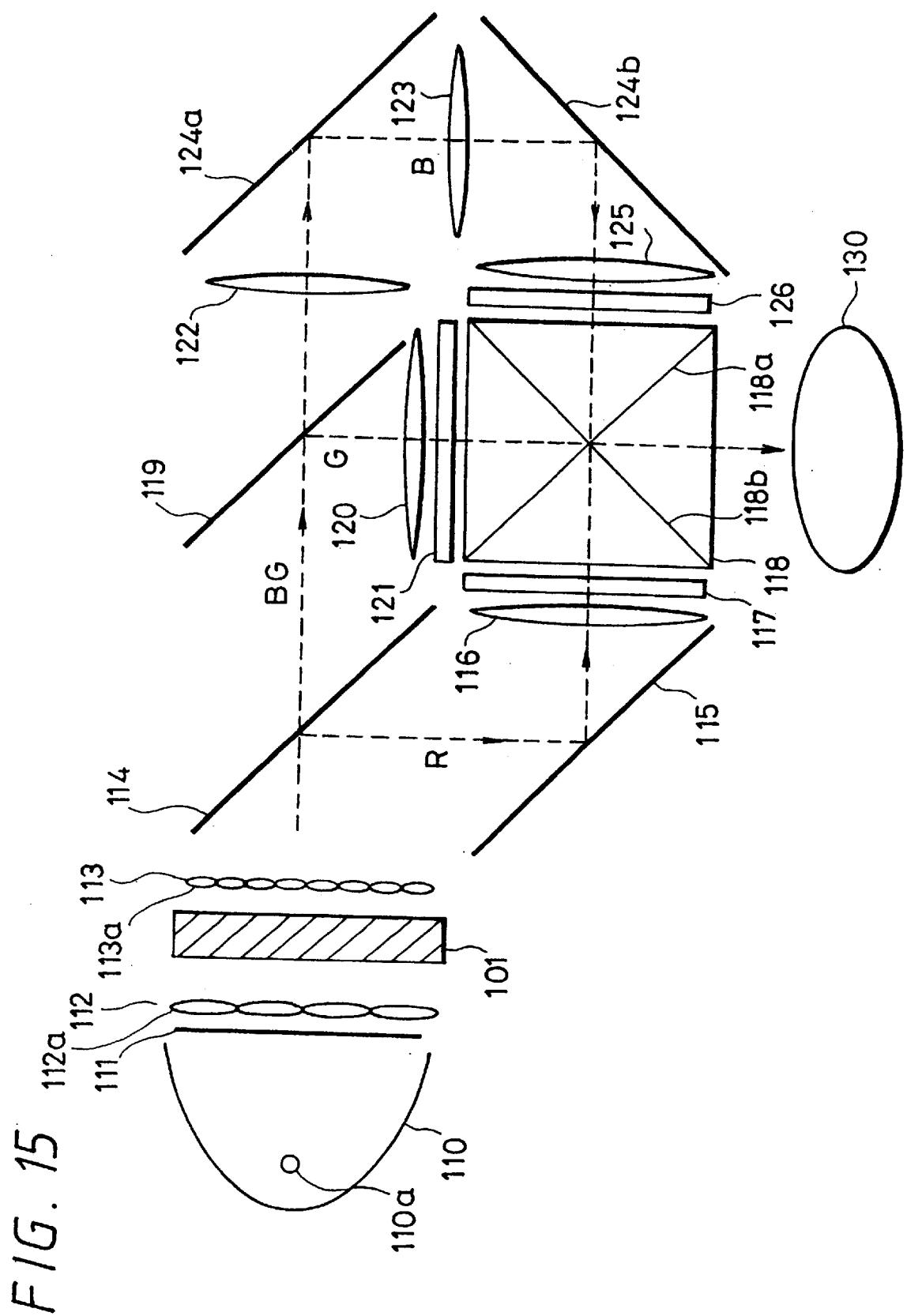
FIG. 15 is a view of an optical system of a liquid crystal projector which employs an optical block comprising prisms.

The red light, the green light, and the blue light which are optically modulated by the liquid crystal panels 17, 21, 26 are combined by a cross dichroic prism 18 as a light combining means. The cross dichroic prism 18 is of the same structure as the cross dichroic prism 58 shown in FIG. 13. The red light R is reflected by a reflecting surface 18a toward a projection lens 30, and the blue light B is reflected by a reflecting surface 18b toward the projection lens 130. The green light G passes through the reflecting surfaces 18a, 18b. The R, G, B rays of light are thus combined to travel along one optical axis, and projected at an enlarged scale onto a screen (not shown) by the projection lens 30.

The structure of the optical block 1 will be described below with reference to FIGS. 1 and 2.

Figure 1:
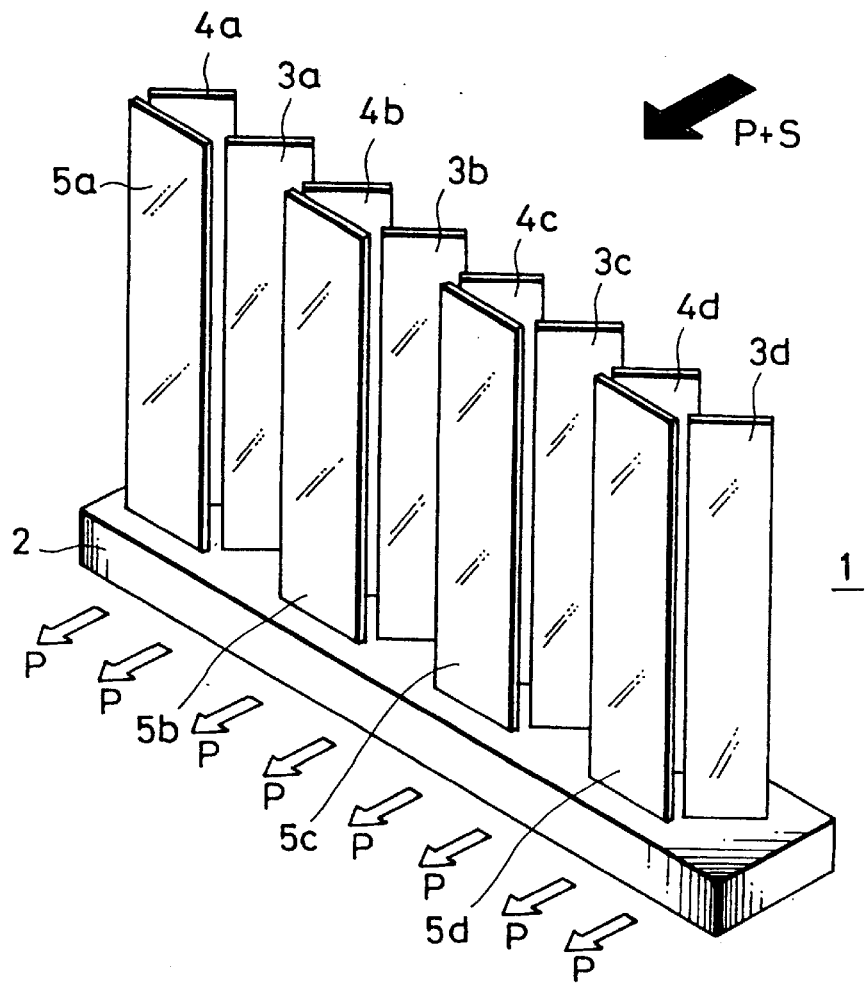
FIG. 1 is a perspective view of an optical block for use in a liquid crystal projector according to an embodiment of the present invention.

FIG. 1 is a perspective view of the optical block 1 as viewed from its front. FIG. 2 is a view schematically showing a portion of the optical block 1 and illustrative of optical paths of light applied from the light source 10.

The optical block 1 comprises optical components including PBSs 3 (3a, 3b, 3c, 3d), mirrors 4 (4a, 4b, 4c, 4d), and ½ λ plates 5 (5a, 5b, 5c, 5d) mounted in grooves defined in an upper surface of a baseboard 2. The PBSs 3 comprise glass plates with $TiO_2$ or the like evaporated on their surfaces, and are press-fitted in the baseboard 2 at an angle to the direction in which light is applied. In this embodiment, the PBSs 3 pass a P wave and reflect an S wave. The mirrors 4 comprise glass plates of elongate rectangular shape with a multilayer film of aluminum, glass, or the like evaporated on their surfaces, for reflecting applied light. The mirrors 4 are mounted on the baseboard 2 at such an angle as to reflect the S wave reflected by the PBSs 3 toward an exit side of the optical block 1. The ½ λ plates 5 comprise glass plates of elongate rectangular shape with a uniaxially stretched ½ phase difference film of polycarbonate, polyvinyl alcohol, or polyethylene terephthalate, for example, applied thereto. The ½ λ plates 5 are mounted on the baseboard 2 at a position for receiving the S wave reflected by the mirrors 4, polarizing the S wave into a P wave, and emitting the P wave.

The optical block 1, which is composed of the PBSs 3, the mirrors 4, the ½ λ plates 5, etc., is capable of converting applied rays of light (P+S waves) into a P wave and emitting the P wave, and has entrance and exit sides whose areas are substantially equal to each other. Since the optical block 1 is of a thinner structure than the conventional optical block, the optical block 1 is a space saver. Furthermore, because the optical block 1 has no prisms, it is lightweight and can be manufactured at a reduced material cost.

Light emitted from the metal halide lamp 10a of the light source 10 is radiated substantially parallel to the optical axis. Therefore, the light converged by the first multilens array 12 projects an electrode image (arc image) radially about the optical axis onto the second multilens array 13. If the convex lenses 13a of the second multilens array 13 are formed so as to correspond to the convex lenses 12a of the first multilens array 12, then the convex lenses 13a are divided vertically with respect to the longitudinal direction (horizontal direction) of the convex lenses 12a, and the convex lenses 13a are formed so as to minimize the difference between longitudinal and transverse lengths for making the aspect ratio closer to 1:1, so that the efficiency with which to utilize light can be increased.

If the effective apertures of the liquid crystal panels are of an aspect ratio of 16:9, then since the convex lenses 12a are formed with an aspect ratio of 16:9, the convex lenses 13a are formed with an aspect ratio of 8:9, for example.

The convex lenses 12a of the first multilens array 12 and the convex lenses 13a of the second multilens array 13 are arranged with their longitudinal direction oriented in the horizontal direction.

The PBSs 3, the mirrors 4, and the ½ λ plates 5 of the optical block 1 are mounted on the baseboard in a juxtaposed fashion parallel to the longitudinal direction of the convex lenses 12a of the first multilens array 12, i.e., horizontally as shown in FIG. 1.

Figure 8:
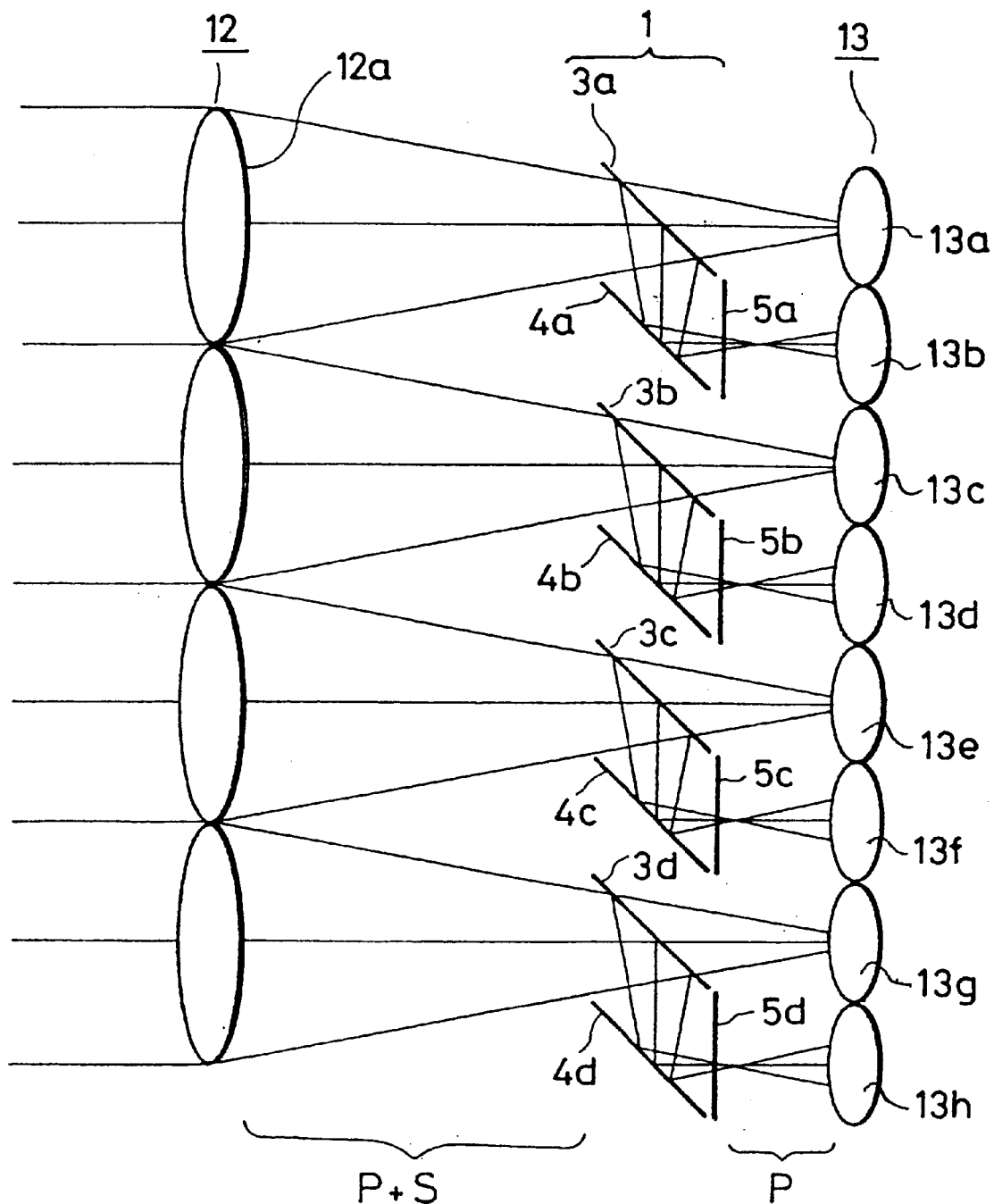
FIG. 8 is a view illustrative of optical paths in multilens arrays and an optical block of the optical system shown in FIG. 7.

Optical paths for converging light with the first multilens array 12, the optical block 1, and the second multilens array 13 will be described below with reference to FIG. 8. The light source 10 is omitted from illustration in FIG. 8. The single convex lens on the exit side of the second multilens array 13 is omitted from illustration in FIG. 8, and the convex lenses 13a are shown as joined together. A condenser lens (not shown) may be disposed on the exit side of the second multilens array 13.

Light emitted from the light source 10 (not shown) is converged by the convex lenses 12a of the first multilens array 12, and applied respectively to the PBSs 3 (3a, 3b, 3c, 3d) of the optical block 1. The optical block 1 emits a P wave which has passed through the PBSs 3 and a P wave converted by the ½ λ plates 5 from an S wave which has been reflected by the PBSs 3 and the mirrors 4.

The P wave emitted from the optical block 1 is applied to the convex lenses of the second multilens array 13 (13a, 13b, ..., 13h).

Figure 9:
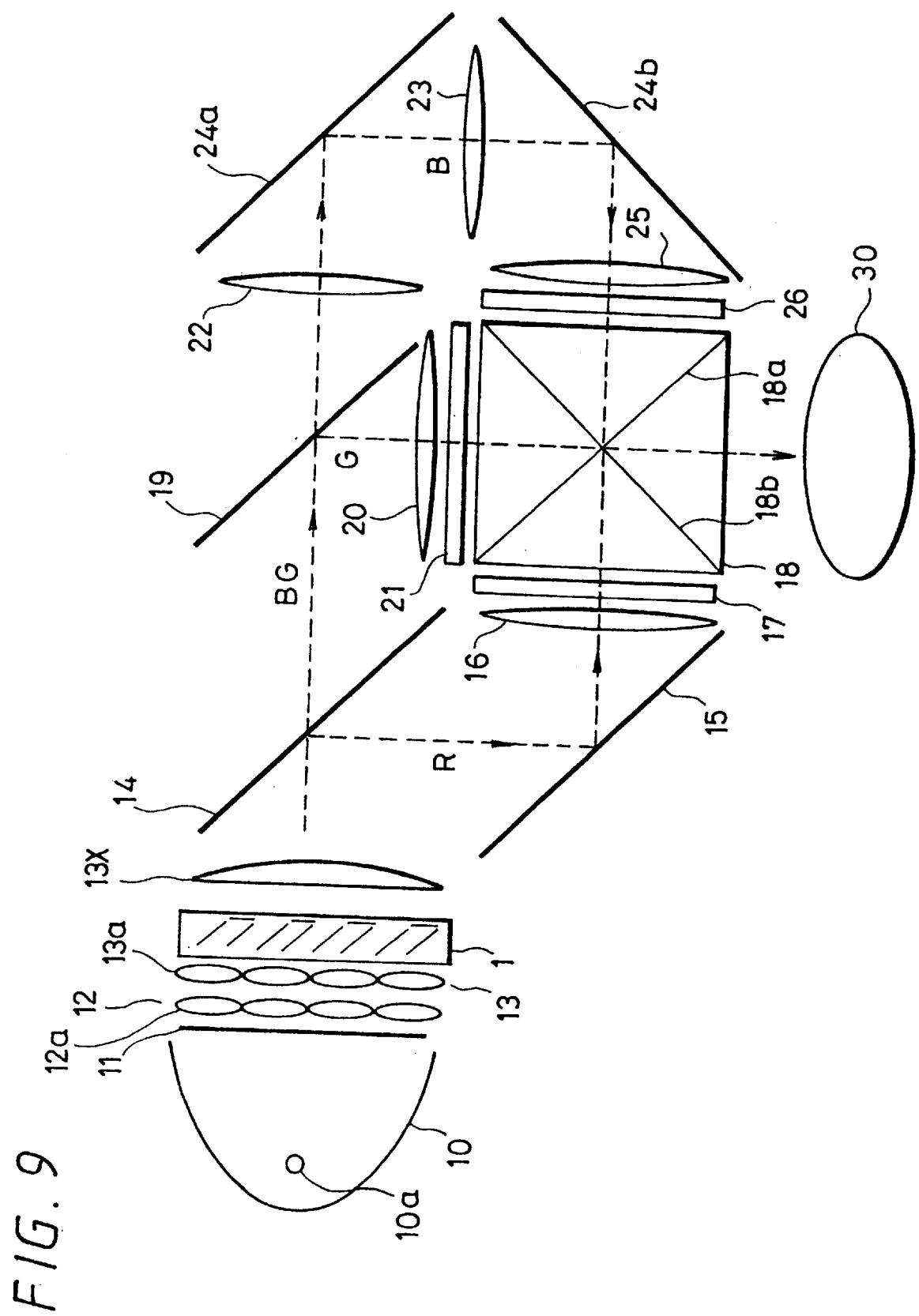
FIG. 9 is a view of an optical system of a liquid crystal projector according to another embodiment of the present invention.

In the above embodiment, the optical block 1 is disposed between the first multilens array 12 and the second multilens array 13. However, as shown in FIG. 9, the first multilens array 12 and the second multilens array 13 may be disposed successively away from the light source 10, and followed by the optical block 1.

If the convex lenses 13a of the second multilens array 13 are formed so as to correspond to the convex lenses 12a of the first multilens array 12, then there are as many convex lenses 13a of the second multilens array 13 as the number of the convex lenses 12a of the first multilens array 12.

For example, if the effective apertures of the liquid crystal panels are of an aspect ratio of 16:9, then since the convex lenses 12a are formed with an aspect ratio of 16:9, the convex lenses 13a are formed with an aspect ratio of 16:9.

In FIG. 7, the condenser lens 13X is disposed behind the convex lenses 13a of the second multilens array 13. In FIG. 9, the condenser lens 13X is disposed behind the optical block 1 which is disposed behind the second multilens array 13, and converges the light emitted from the optical block 1 onto the liquid crystal panels.

Inasmuch as there is a difference between the length of the optical path of the light which has passed through the PBSs 3 and the length of the optical path of the light which has been reflected by the PBSs 3, they would be converged at different positions by the condenser lens. In view of this, the second multilens array 13 is positioned in front of the optical block 1. If the lenses of the first multilens array 12 and the second multilens array 13 are the same as each other, since principal rays of light applied to the optical block 1 are composed of parallel light, the light which has passed through the PBSs 3 and the light which has been reflected by the PBSs 3 are not converged at different positions even though there is a difference between the lengths of their optical paths.

An optical block according to another embodiment of the present invention will be described below.

Figure 3:
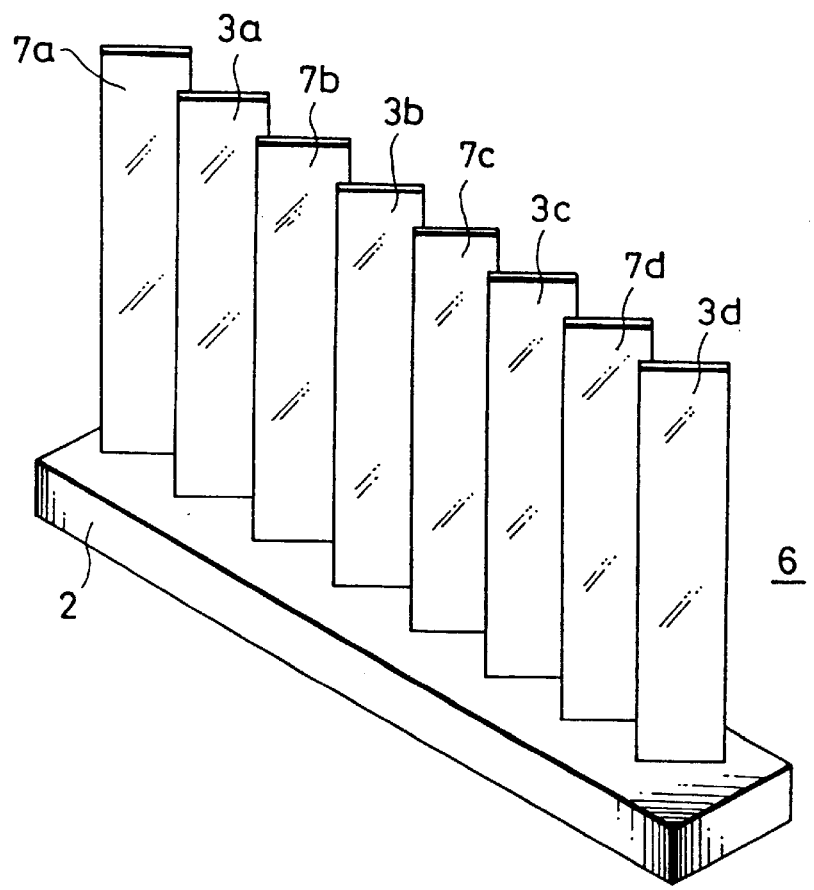
FIG. 3 is a perspective view of an optical block according to another embodiment of the present invention.
Figure 4:
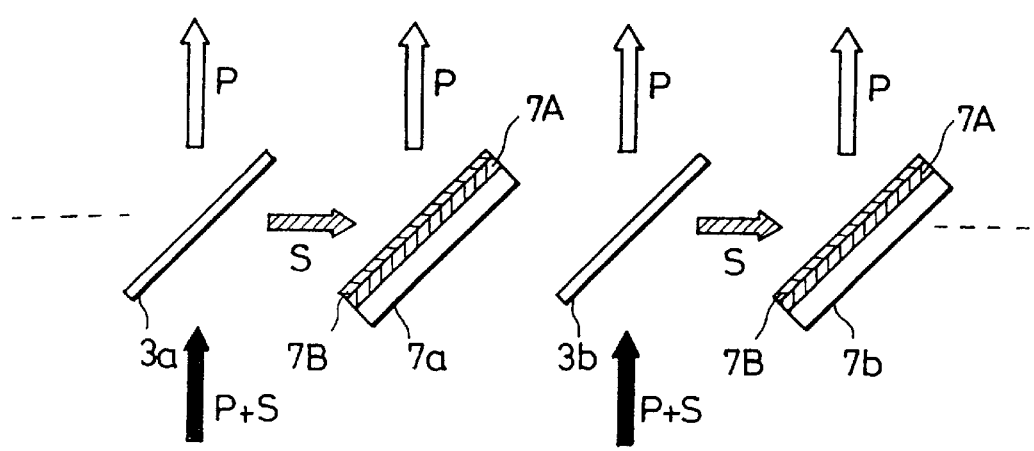
FIG. 4 is a view illustrative of optical paths in the optical block shown in FIG. 3.

FIG. 3 is a perspective view of an optical block 6 as viewed from its front, and FIG. 4 is a view schematically showing a portion of the optical block 6 and illustrative of optical paths of light applied from the light source 10.

The optical block 6 shown in FIGS. 3 and 4 comprises PBSs 3 (3a, 3b, 3c, 3d) mounted on a baseboard 2 for separating P+S waves into a P wave and an S wave, as with the optical block 1. The P wave passes through the PBSs 3, and the S wave is reflected by the PBSs 3 and then reaches polarizing mirrors 7 (7a, 7b, 7c, 7d) as polarizing mirror means.

As shown in FIG. 4, each of the polarizing mirrors 7 comprises a mirror layer 7A disposed as a reflecting layer on a glass plate of elongate rectangular shape and a polarizer layer 7B comprising a ¼ phase difference film applied as a plane-of-polarization rotating layer to an upper surface of the mirror layer 7A. The S wave reflected by the PBSs 3 is applied to the polarizer layers 7B, which circularly polarize the S wave. The S wave then reaches the mirror layers 7A, which reflect the S wave toward an exit side of the optical block 6. The S wave passes the polarizer layers 7B, which linearly polarize the S wave. As a result, since the plane of polarization of the S wave is rotated 90°, the S wave is emitted as a P wave to the exit side of the optical block 6.

In this embodiment, the number of components mounted on the baseboard 2 is reduced.

Figure 16:
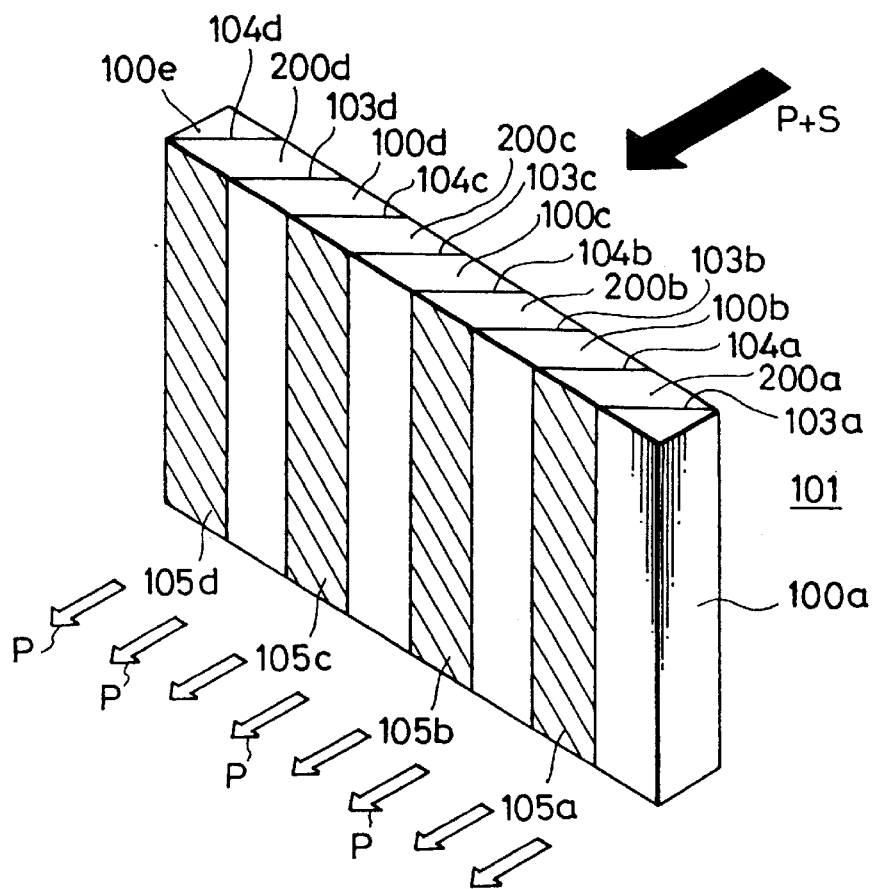
FIG. 16 is a view of the optical block in the optical system shown in FIG. 15, the optical block having polarizing beam splitters, reflecting means, and prisms disposed on exit sides for emitting a first polarized component, of the polarizing beam splitters.
Figure 17:
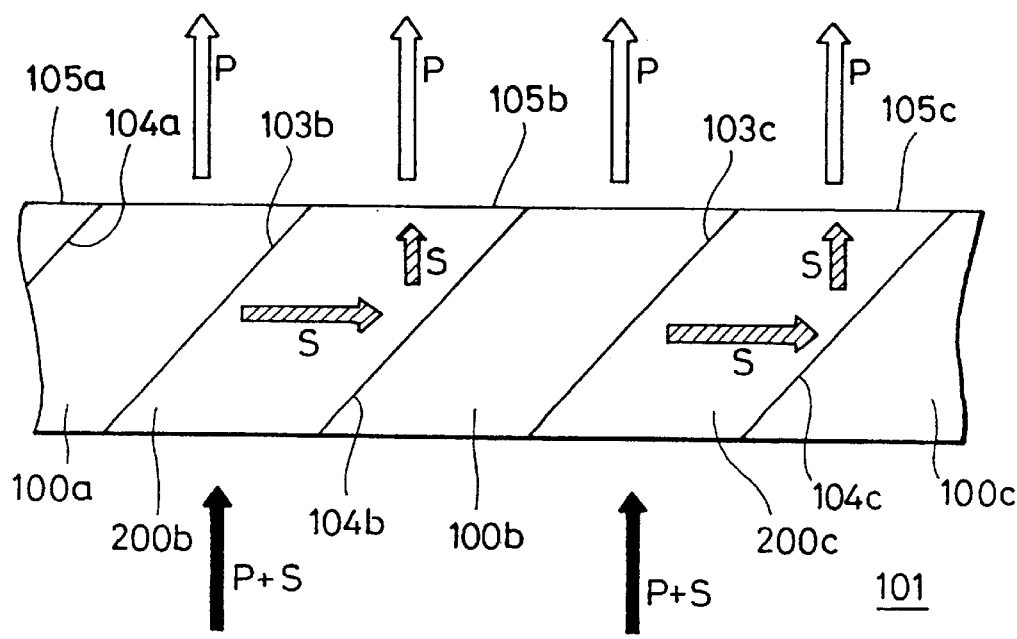
FIG. 17 is a view illustrative of optical paths in the optical block shown in FIG. 16.
Figure 18:
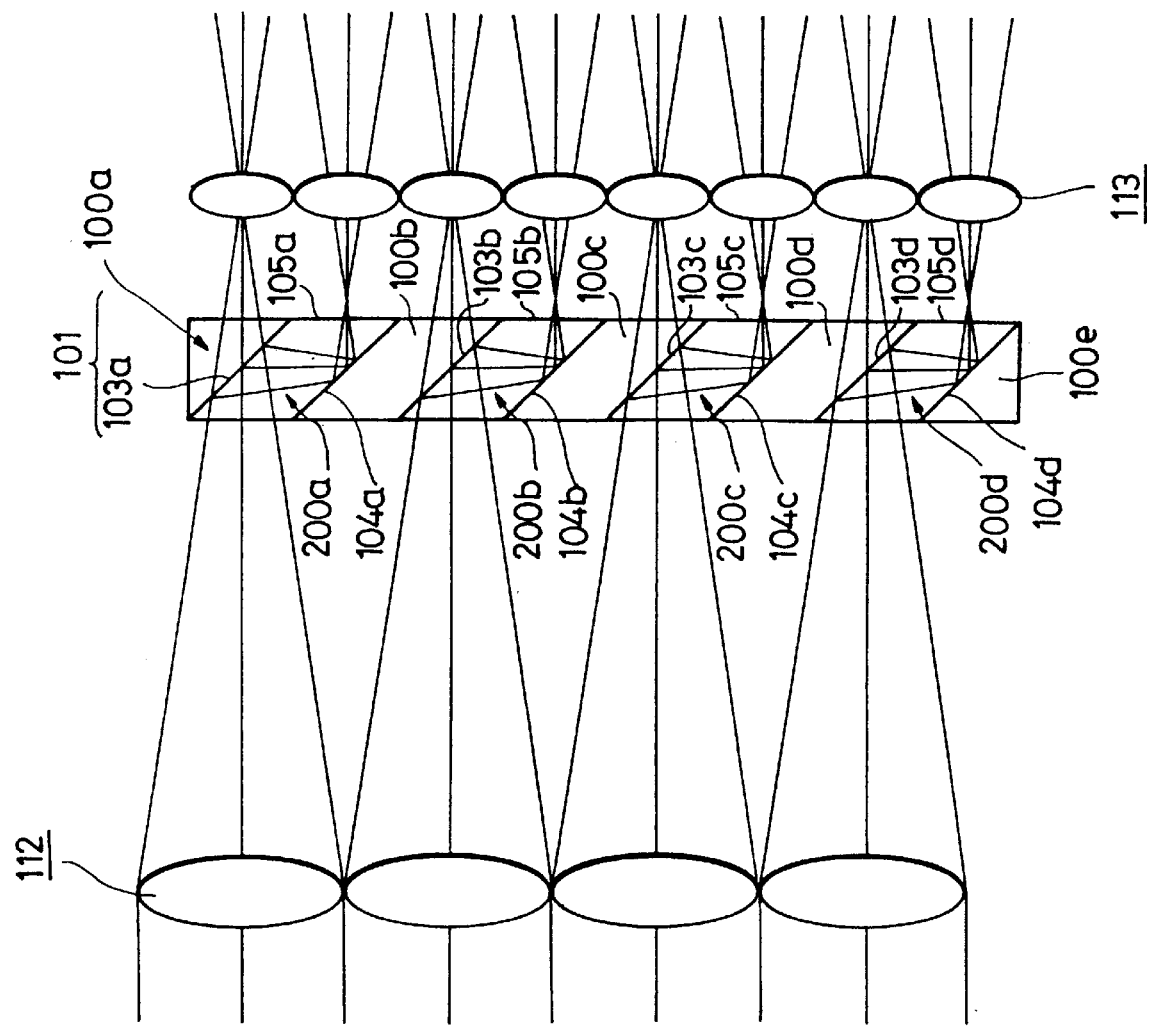
FIG. 18 is a view of the optical block shown in FIG. 16 and multilens arrays.

The structure in which the plane-of-polarization rotating layer is mounted on the upper surface of the reflecting layer may be incorporated in the optical block 101 which employs prisms, as shown in FIGS. 16 and 17.

Figure 10:
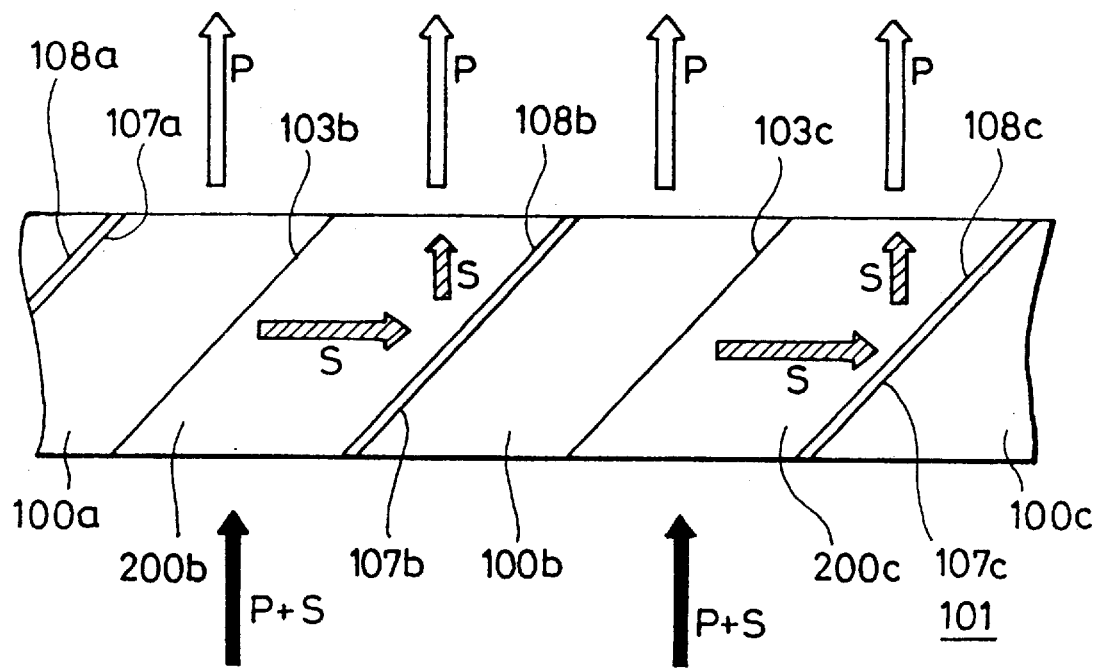
FIG. 10 is a view of an optical block comprising prisms, which incorporates the arrangement shown in FIGS. 3 and 4.

As shown in FIG. 10 which schematically illustrates a portion of the optical block 101, PBSs 103 (103a, 103b, 103c, 103d) for reflecting an S wave and passing a P wave, for example, are disposed on slanted exit surfaces of the prisms 200 (200a, 200b, 200c, 200d), and mirror layers 107 (107a, 107b, 107c, 107d) as reflecting layers for reflecting forward the S wave reflected by the PBSs 103 are disposed on slanted surfaces of the prisms 100 which face the PBSs 103. Polarizer layers 108 (108a, 108b, 108c, 108d) comprising ¼ phase difference films applied as plane-of-polarization rotating layers are disposed on upper surfaces of the mirror layers 107 closer to the prisms 200. The S wave reflected by the PBSs 103 is applied to the polarizer layers 108, which circularly polarize the S wave. The S wave then reaches the mirror layers 107 and is reflected thereby toward the exit side. When the S wave passes the polarizer layers 108 again, it is linearly polarized thereby. As a result, since the plane of polarization of the S wave is rotated 90°, the S wave is emitted as a P wave forward from the prisms 200.

The process of manufacturing the optical block is simplified because the number of surfaces where reflecting surfaces, etc. are formed on the prisms 200, 100 is reduced.

Inasmuch as the separating characteristics of the PBSs 3 depend on the angle of incidence, it is preferable to apply light at the same angle to the PBSs 3. In the optical blocks 1, 6 described with reference to FIGS. 1 through 4, since the PBSs 3 (3a, 3b, 3c, 3d) are oriented in the same direction, light is applied to the PBSs 3 in right and left ends at different angles of incidence, and hence those PBSs 3 have different separating characteristics. These different separating characteristics appear directly in the image, tending to produce a phenomenon such as color variations at the right and left ends.

Figure 2:
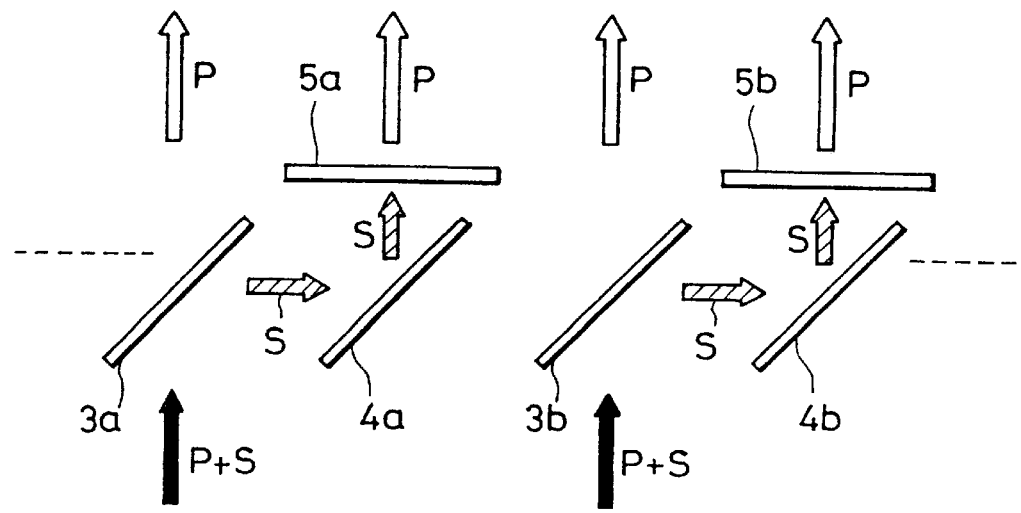
FIG. 2 is a view illustrative of optical paths in the optical block shown in FIG. 1.
Figure 5:
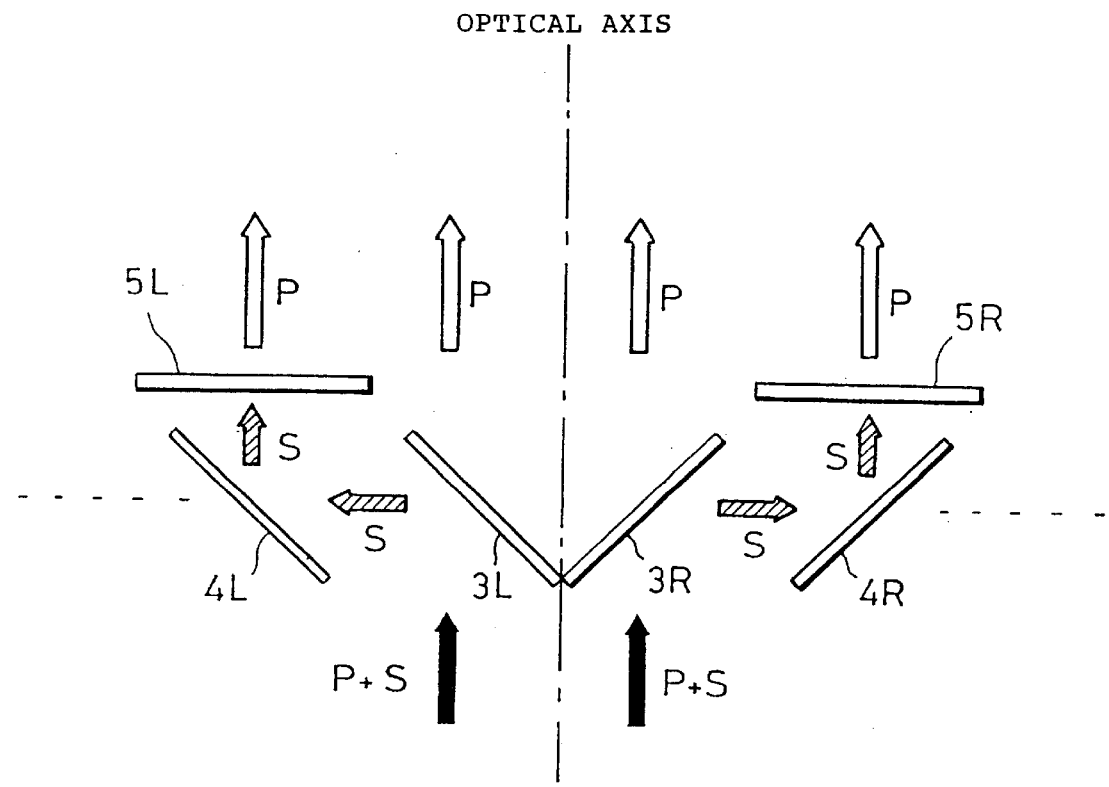
FIG. 5 is a view illustrative of optical paths in an optical block according to still another embodiment of the present invention.
Figure 6:
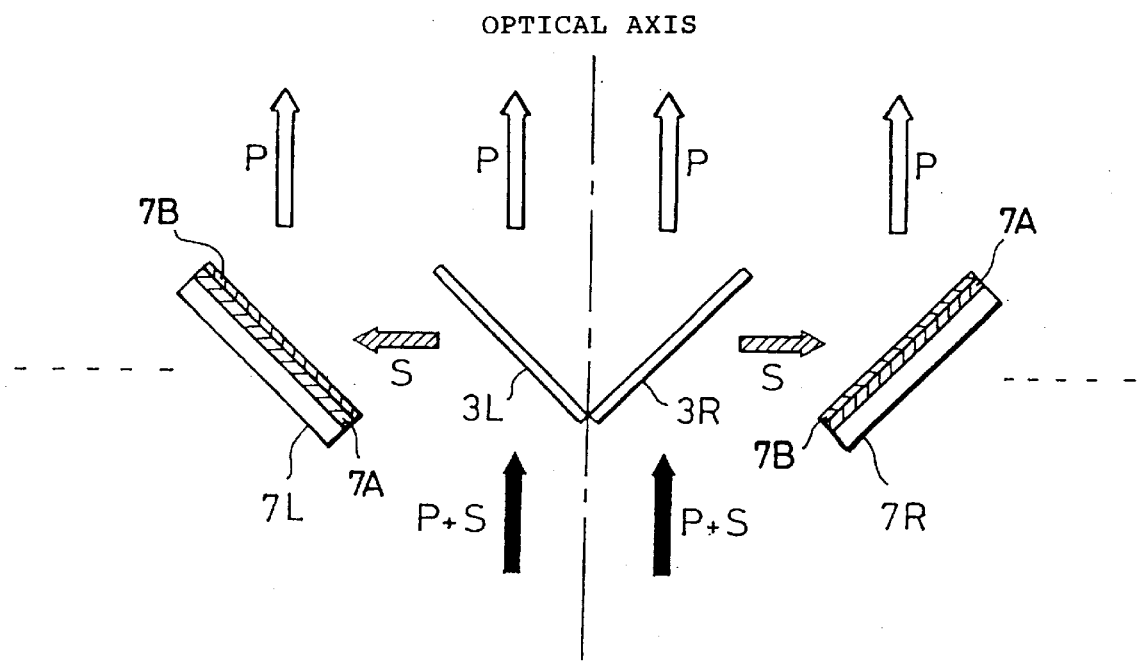
FIG. 6 is a view illustrative of optical paths in an optical block according to yet still another embodiment of the present invention.

To avoid such color variations, as shown in FIGS. 5 and 6 which illustrate optical blocks corresponding to those shown in FIGS. 2 and 4, PBSs 3L, 3R are arranged substantially in a V-shaped pattern spreading toward the exit side and symmetrical with respect to the optical axis which is indicated by the dot-and-dash line. Mirrors 4L, 4R shown in FIG. 5 and mirrors 7L, 7R with plane-of-polarization rotating layers mounted thereon shown in FIG. 6 are also arranged substantially in a V-shaped pattern.

With this arrangement, light is applied at the same angle to the PBSs 3L, 3R that are mounted at the same distance from the optical axis. Since the dependency on the angle of incidence is canceled, any color variations that may appear in the image can be reduced.

The structure in which the PBSs and the reflecting surfaces are arranged symmetrically with respect to the optical axis of the optical block may be incorporated in the optical block 101 which employs prisms, as shown in FIGS. 16 and 17.

Figure 11:
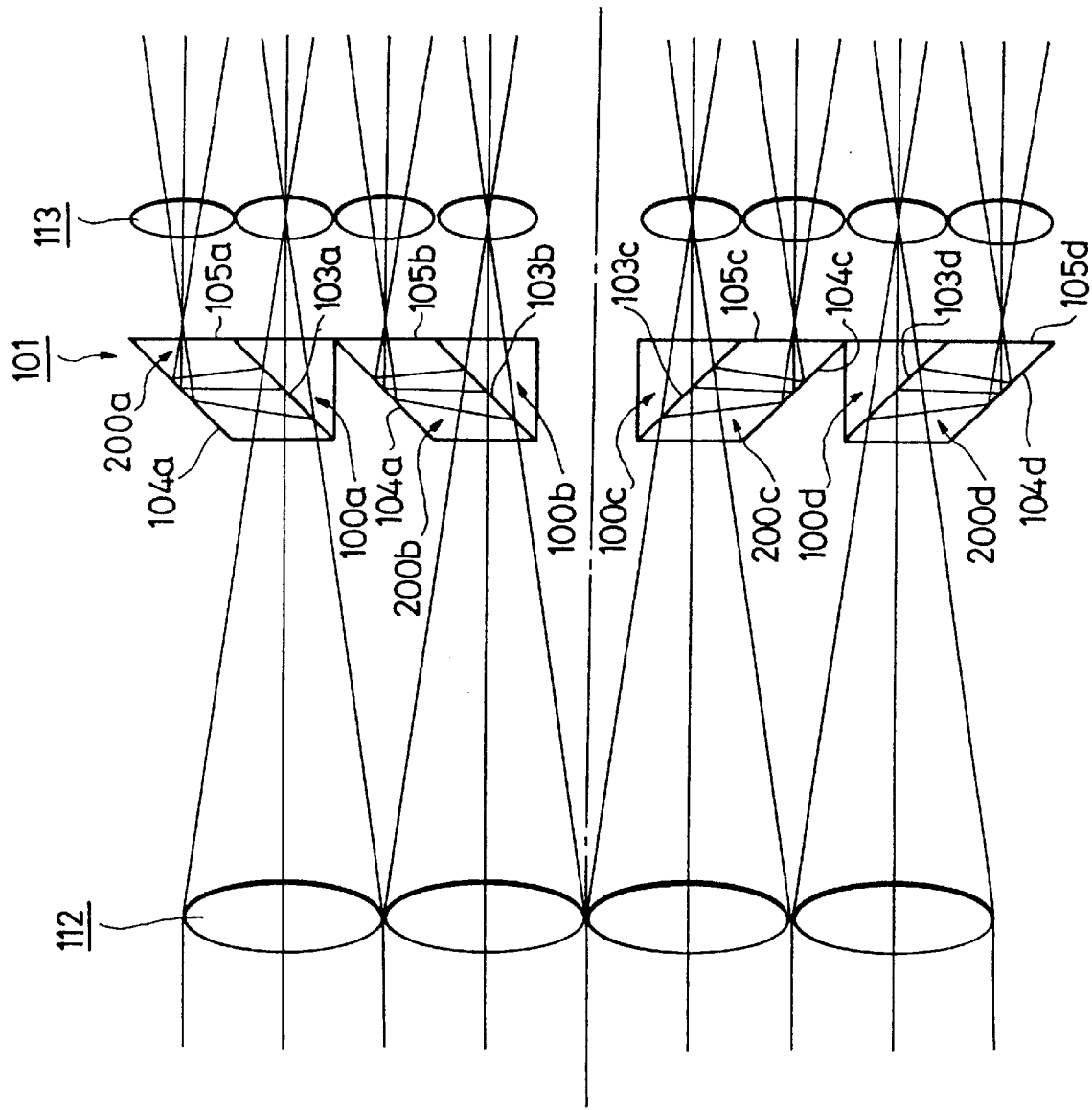
FIG. 11 is a view of an optical block comprising prisms, which incorporates the arrangement shown in FIG. 5.
Figure 12:
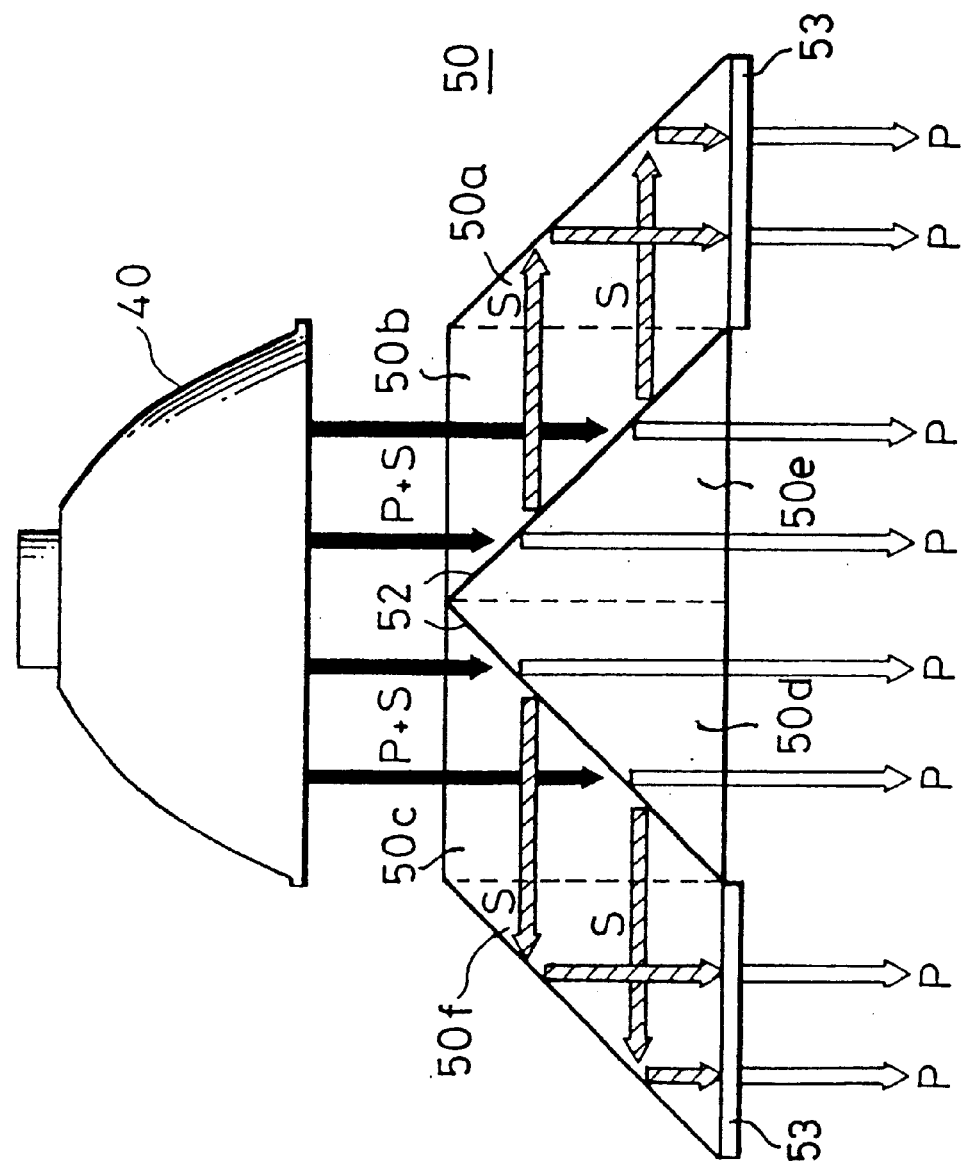
FIG. 12 is a view of an optical block as a conventional optical means and optical paths therein.

As shown in FIG. 11 which illustrates the optical block 101 and the front and rear multilens arrays 112, 113, the parallelogrammatic prisms 200 (200a, 200b, 200c, 200d) and triangular prisms 100 (100a, 100b, 100c, 100d) are arranged symmetrically with respect to the optical axis which is indicated by the dot-and-dash line.

Light applied from the first multilens array 112 to the optical block 101 is applied at the same angle on both sides of the optical axis. Therefore, the dependency on the angle of incidence is canceled, and hence any color variations that may appear in the image can be reduced.

The optical blocks according to the embodiments shown in FIGS. 4, 5, 10, and 11 and others can be incorporated in the liquid crystal projectors shown in FIGS. 7 and 9.

In the above embodiments, the present invention has been applied to a three-plate liquid crystal projector. However, the present invention may be applied to a single-plate liquid crystal projector, a 3D (3-dimensional) liquid crystal projector, or an optical system for converting laser beam polarization highly efficiently.

According to the present invention, as described above, since the entrance and exit sides of an optical block can be of the same size as the aperture of a light source, the optical block can have a thin structure. Therefore, the optical block may be a space saver and lightweight. The cost of the optical block may be reduced as prisms are dispensed with.

Because the entrance and exit sides of the optical block can be of the same size as the aperture of the light source, the optical paths from the light source to the liquid crystal panels can be shortened, and hence the display apparatus can be reduced in size.

If the plane-of-polarization rotating layers are disposed on the upper surfaces of the reflecting layers of the optical block, then the number of components may be reduced, and the process of manufacturing the optical block may be simplified.

If the components of the optical block are arranged symmetrically with respect to the optical axis of incident light, then the dependency on the angle of incidence can be canceled, and any color variations that may appear in the image can be reduced.

What is claimed is:

1. A display apparatus comprising:

a light source having an aperture for emitting light therefrom;

a first multilens array for being irradiated with the light emitted from said light source;

an optical block having an entrance side and an exit side and being formed of a baseboard and a polarizing beam splitter mounted thereon at a predetermined angle with respect to light applied from said first multilens array for passing a first polarized component of the light in a first direction and for reflecting a second polarized component of the light in a second direction, reflecting means having said predetermined angle for reflecting the reflected second polarized component in said first direction, and plane-of-polarization rotating means for rotating a plane of polarization of said second polarized component reflected in said first direction, wherein said entrance side and said exit side are of a same size as said aperture of said light source;

a second multilens array for being irradiated with light emitted from said optical block;

separating means for separating light emitted from said second multilens array into red light, green light, and blue light;

light modulating means for generating modulated red light, modulated green light, and modulated blue light corresponding to a video signal which represents a video image to be projected, based on the red light, the green light, and the blue light; and emitting means for combining said modulated red light, said modulated green light, and said modulated blue light outputted from said light modulating means and for emitting combined modulated light.

2. A display apparatus comprising:

a light source for emitting light;

a first multilens array for being irradiated with the light emitted from said light source;

a first optical block having a first polarizing beam splitter having a first angle with respect to light applied from said first multilens array for passing a first polarized component of the light in a first direction and for reflecting a second polarized component of the light in a second direction, first reflecting means having said first angle for reflecting the reflected second polarized component in said first direction, and first plane-of-polarization rotating means having a second angle substantially perpendicular to said first direction for rotating a plane of polarization of said second polarized component reflected in said first direction;

a second optical block having a second polarizing beam splitter having a third angle at which the second polarizing beam splitter and the first polarizing beam splitter are symmetrical with respect to an optical axis of the light applied from the light source for passing a first polarized component of the light applied from the light source in a first direction and for reflecting a second polarized component of the light applied from the light source in a second direction, second reflecting means disposed at said third angle for reflecting the reflected second polarized component in said first direction, and second plane-of-polarization rotating means disposed at said second angle for rotating the plane of polarization of said second polarized component reflected in said first direction;

a second multilens array for being irradiated with light emitted from said first optical block and said second optical block;

separating means for separating light emitted from said second multilens array into red light, green light, and blue light;

light modulating means for generating modulated red light, modulated green light, and modulated blue light corresponding to a video signal which represents a video image to be projected, based on the red light, the green light, and the blue light; and emitting means for combining said modulated red light, said modulated green light, and said modulated blue light outputted from said light modulating means and for emitting combined modulated light.

3. A display apparatus comprising:

a light source for emitting light;

a first multilens array for being irradiated with the light emitted from said light source;

an optical block having a polarizing beam splitter having a predetermined angle with respect to light applied from said first multilens array for passing a first polarized component of the light in a first direction and for reflecting a second polarized component of the light in a second direction and having reflecting and polarizing means disposed at said predetermined angle and having a reflecting layer for reflecting the reflected second polarized component in said first direction and a plane-of-polarization rotating layer disposed on an upper surface of said reflecting layer for rotating a plane of polarization of said second polarized component;

a second multilens array for being irradiated with light emitted from said optical block;

separating means for separating light emitted from said second multilens array into red light, green light, and blue light;

light modulating means for generating modulated red light, modulated green light, and modulated blue light corresponding to a video signal which represents a video image to be projected, based on the red light, the green light, and the blue light; and emitting means for combining said modulated red light, said modulated green light, and said modulated blue light outputted from said light modulating means and for emitting combined modulated light.

4. A display apparatus comprising:

a light source for emitting light;

a first multilens array for being irradiated with the light emitted from said light source;

an optical block having a polarizing beam splitter having a predetermining angle with respect to light applied from said first multilens array for passing a first polarized component of the light in a first direction and for reflecting a second polarized component of the light in a second direction and having reflecting and polarizing means disposed at said predetermined angle and having a reflecting layer for reflecting the reflected second polarized component in said first direction and a plane-of-polarization rotating layer disposed on an upper surface of said reflecting layer for rotating a plane of polarization of said second polarized component;

a second multilens array for being irradiated with light emitted from said optical block;

separating means for separating light emitted from said second multilens array into red light, green light, and blue light;

light modulating means for generating modulated red light, modulated green light, and modulated blue light corresponding to a video signal which represents a video image to be projected, based on the red light, the green light, an d the blue light; and emitting means for combining said modulated red light, said modulated green light, and said modulated blue light outputted from said light modulating means and for emitting combined modulated light.

* * * * *